(12) United States Patent
Kuo (10) Patent No.: US 11,527,344 B2
(45) Date of Patent: Dec. 13, 2022

(54) MAGNETIC ATTRACTION CONNECTION STRUCTURE

(71) Applicant: Yi-Ching Kuo, Taipei (TW)

(72) Inventor: Yi-Ching Kuo, Taipei (TW)

( * ) Notice: Subject to any disclaimer, the term of this patent is extended or adjusted under 35 U.S.C. 154(b) by 66 days.

(21) Appl. No.: 17/148,494

(22) Filed: Jan. 13, 2021

(65) Prior Publication Data

US 2022/0013267 A1    Jan. 13, 2022

(30) Foreign Application Priority Data

Jul. 8, 2020 (TW) ................................. 109123025

(51) Int. Cl.
   *H01F 7/02* (2006.01)
   *F16B 1/00* (2006.01)
   *F16B 5/00* (2006.01)

(52) U.S. Cl.
   CPC ................. *H01F 7/02* (2013.01); *F16B 1/00* (2013.01); *F16B 5/0004* (2013.01); *F16B 2001/0035* (2013.01)

(58) Field of Classification Search
   CPC .. H01F 7/02; F16B 1/00; F16B 5/0004; F16B 2001/0035; E04F 13/0883; A63H 33/046; E04B 2002/7468
   See application file for complete search history.

(56) References Cited

U.S. PATENT DOCUMENTS

| 3,889,736 | A | * | 6/1975 | Firks | G09F 15/0068 |
| | | | | | 16/225 |
| 4,835,923 | A | * | 6/1989 | Ybarra | E04B 2/7409 |
| | | | | | 52/DIG. 5 |
| 4,934,119 | A | * | 6/1990 | Ybarra | E04F 13/0883 |
| | | | | | 52/764 |
| 6,311,441 | B1 | * | 11/2001 | Beavers | E04F 15/02144 |
| | | | | | 52/239 |
| 9,643,100 | B2 | * | 5/2017 | Fein | A63H 33/046 |
| 2010/0120322 | A1 | * | 5/2010 | Vicentelli | A63H 33/046 |
| | | | | | 446/92 |
| 2015/0065007 | A1 | * | 3/2015 | Klepper | A63H 33/046 |
| | | | | | 446/92 |
| 2018/0258965 | A1 | * | 9/2018 | Danko | E05D 7/10 |
| 2018/0305924 | A1 | * | 10/2018 | Buffington | E04B 2/7405 |

FOREIGN PATENT DOCUMENTS

WO    WO-2019150598 A1 *  8/2019  ........... A63H 33/046

* cited by examiner

*Primary Examiner* — Robert Sandy
*Assistant Examiner* — Rowland Do
(74) *Attorney, Agent, or Firm* — Leong C. Lei (57) ABSTRACT

A magnetic attraction connection structure includes a main body. The main body has a peripheral edge on which at least one connection surface is defined. The main body is provided with at least one movement space in an interior of the peripheral edge at one side of the connection surface. The movement space is provided with a magnet arranged in an interior thereof. The movement space is of a size that is sufficient to allow the magnet to move in a direction toward the connection surface or to rotate by an angle. In use, the connection surface of the main body is placed in direct contact with another main body at the location corresponding to the magnets, such that the magnets arranged in the two movement spaces automatically move or rotate due to magnetic attraction of opposite magnetic polarities, so as to securely fix the main bodies together.

4 Claims, 16 Drawing Sheets

MAGNETIC ATTRACTION CONNECTION STRUCTURE

TECHNICAL FIELD OF THE INVENTION

The present invention relates to a connection structure, and more particularly to a magnetic attraction connection structure that enables formation of various three-dimensional configuration through connection achieved with direct contact, requiring no exposed connecting piece, and showing no protruding piece at the connection site.

DESCRIPTION OF THE PRIOR ART

Most of the combination partition system involves connecting members that include, generally, aluminum posts, horizontal locking pieces, and clamped boards. In other words, the posts that are generally of an octagonal form and arranged upright are connected with the horizontal locking pieces to form a metal structure into which the clamped boards are inserted to provide a combined system. Such a combination partition system is considered the most environment-friendly and most practical exhibition stand construction system in all the countries around the world.

Recently, large-sized digital printing output devices have been greatly advanced and due to market competition, more and more exhibition participants are no longer satisfied with the simple form of partition boards and large-sized posters are vastly used to decorate the exhibition stand. Consequently, the combined partition system is commonly used as a frame for holding the posters, and functions beyond just a partition structure and providing not just the effect of partitioning.

However, posting or attaching the large-sized poster to such a combined partition system would suffer a severe issue that such an upright post is arranged in each one-meter span to support the clamped board, such that the entire aesthetic large-sized poster has to be divided and thus destroyed by such posts that are arranged at intervals of one meter.

Recently, the exhibition stand designers and the exhibition stand manufacturers use, as an alternative way, large-sized posters with backside gluing that is adhered to a foam board, also referred to as a KT board, a PVC-laminated foam board, or a paper-laminated foam board. Such materials are generally foamed material subjecting to additional processing, making them unrecyclable and not environment-friendly and also not flame resistant. This becomes a concern of potential risks for exhibition.

Further, such a combined partition system involves a number of major components and accessory parts. Such components and parts are of different shapes and different sizes, making such a system involving extremely complicated parts and components, which lead to a high cost and make an operation of assembling or dismounting very inefficient. Further, the stowage and transportation of such components and parts, after being dismounted from an exhibition stand that is not in use, are not easy.

Thus, such a known combined partition system is imperfect and requires further improvement.

SUMMARY OF THE INVENTION

An objective of the present invention is to provide a magnetic attraction connection structure that enables formation of various three-dimensional configurations through connection achieved with direct contact, requiring no exposed connecting piece, and showing no protruding piece at the connection site.

To achieve the above objective, the present invention comprises a main body. The main body has a peripheral edge on which at least one connection surface is defined. The main body is provided with at least one movement space that is formed in an interior of the peripheral edge at one side of the connection surface. The movement space is provided with a magnet arranged in an interior thereof. The movement space is of a size that is sufficient to allow the magnet to move in a direction toward the connection surface or to rotate by an angle.

In use, the connection surface of the main body is set to face another main body such that the outside surfaces of the main bodies are put in contact with each other at a location corresponding to the magnets thereof. The magnets that are disposed in two of such movement spaces automatically move or rotate due to magnetic attraction of opposite magnetic polarities, so as to mutually and magnetically attract each other, allowing the contact surfaces of the two main bodies to securely fix to each other through connection resulting from magnetically attracting each other. Thus, there is no need for any exposed connecting piece to have multiple such main bodies to directly contact and connect for forming various three-dimensional configurations, such as a box and a partition structure, and there will be protruding piece at the connection site.

The present invention has advantages of aesthetics, environment-friendliness, reduced number of components, which leads to a reduced cost, easy and convenient assembly, and being easy to stow and transport.

A detailed description will be provided below, as an example of illustration only, for the present invention, with reference being had to the attached drawings.

DETAILED DESCRIPTION OF THE PREFERRED EMBODIMENT

Figure 1:
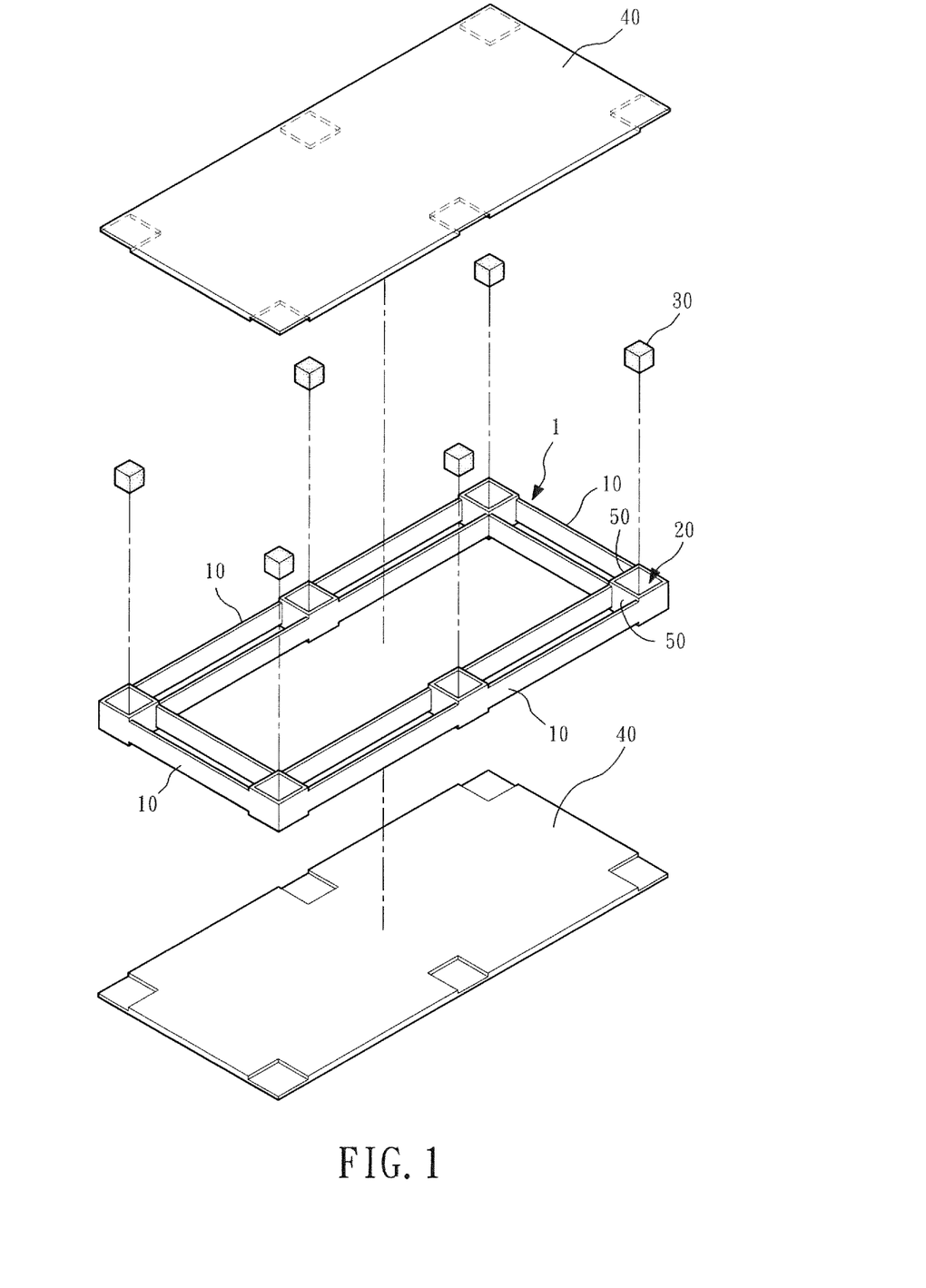
FIG. 1 is an exploded view of the present invention.
Figure 2:
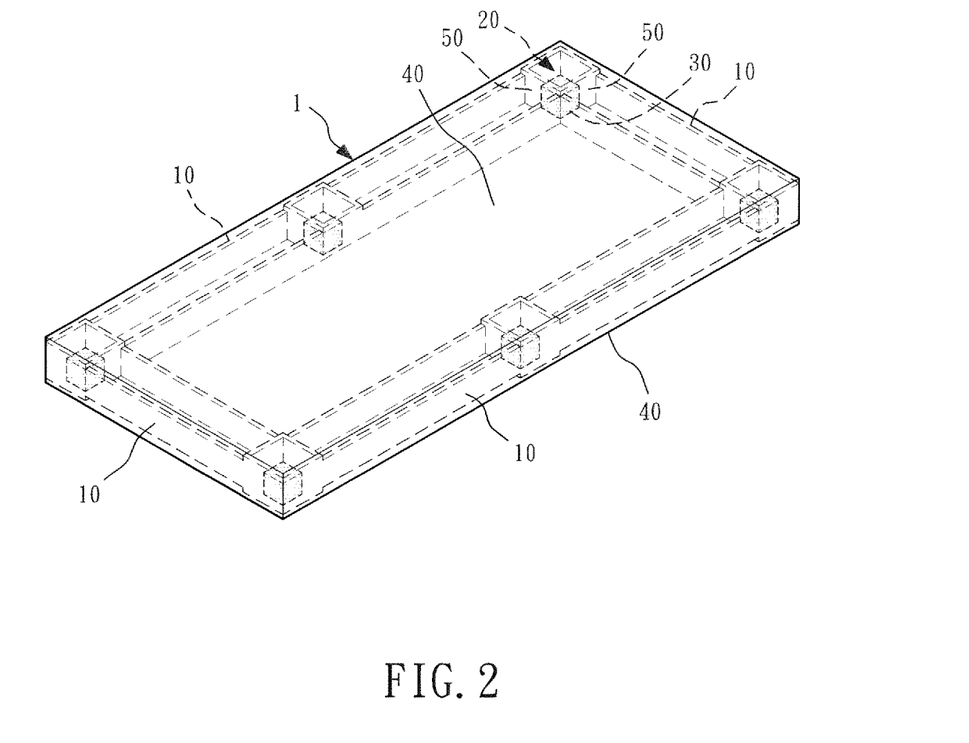
FIG. 2 is a perspective view of the present invention.
Figure 3:
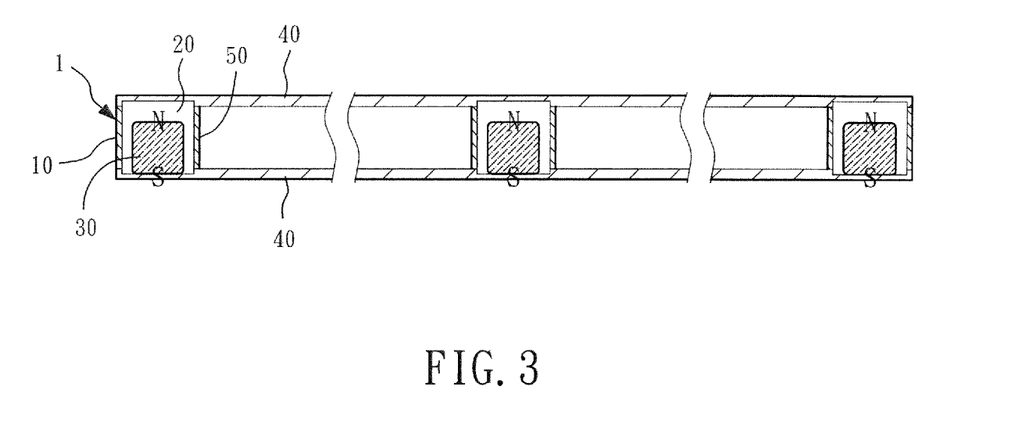
FIG. 3 is a cross-sectional view of the present invention.

Referring to FIGS. 1-3, the present invention comprises a main body 1. The main body 1 has a peripheral edge, on which at least one connection surface 10 is defined. The main body 1 is provided with at least one movement space 20 that is formed in an interior of the peripheral edge at one side of the connection surface 10. The movement space 20 is provided, in the interior thereof, with a magnet 30. The movement space 20 has a size that allows the magnet 30 to move in a direction toward the connection surface 10 or to make rotation of an angle.

In an embodiment of the structure, the peripheral edge of the main body 1 forms a frame, and the frame is provided, on each of an upper side and a lower side thereof, with a surface panel 40 to jointly form a configuration of a board.

In an embodiment of the structure, the peripheral edge of the main body 1 is provided in the interior thereof with a separation plate 50 to delimit and form the movement space 20.

In an embodiment of the structure, the magnet 30 is selected as a powerful magnet.

In an embodiment of the structure, the magnet 30 has a cubic shape.

The above provides a description to each of the components of the present invention, as well as a way of assembly thereof, while in the following, an example of use, features, and advantages of the present invention will be described.

Figure 4:
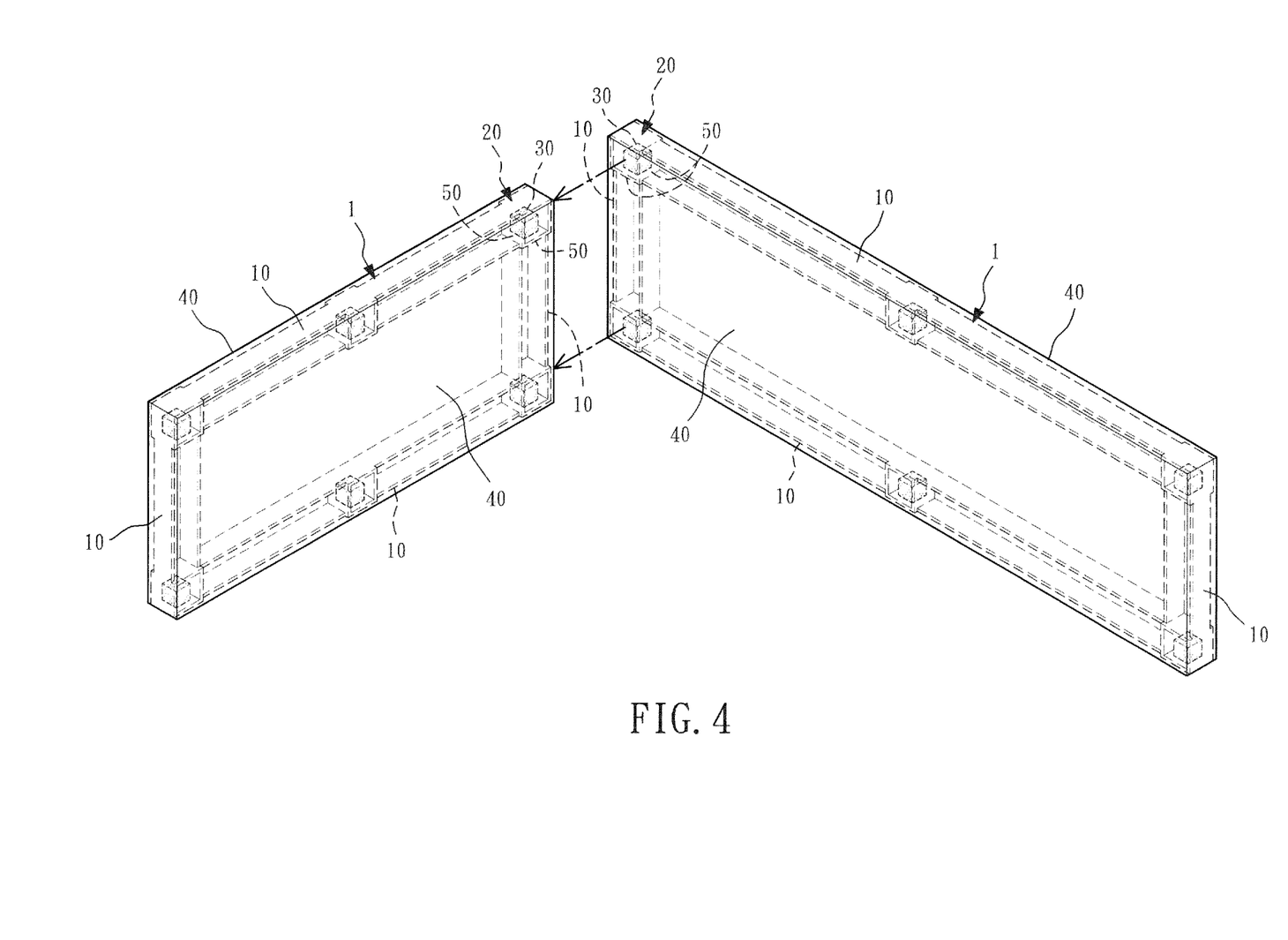
FIGS. 4-11 are schematic views demonstrating an example of use of the present invention.
Figure 5:
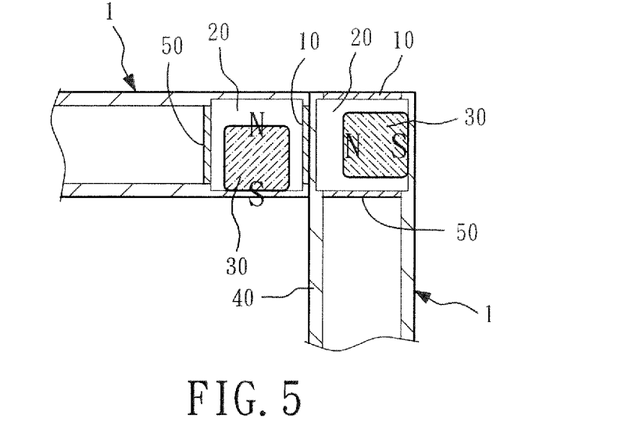

Referring to FIGS. 4 and 5, in use, the connection surface 10 of the main body 1 is set to face another main body 1 such that the outside surfaces (10 and/or 40) of the main bodies are put in contact with each other at a location corresponding to the magnets 30 thereof.

Figure 6:
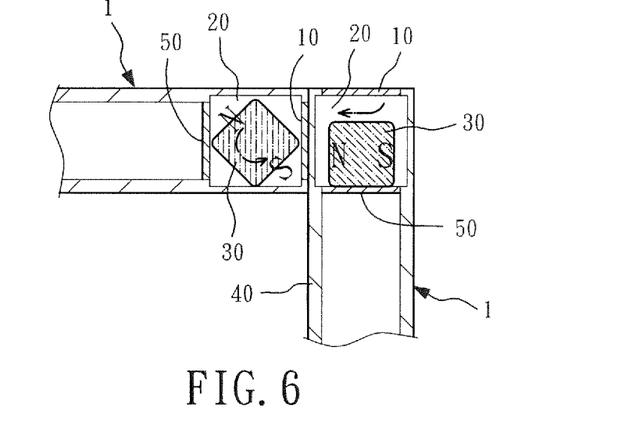
Figure 7:
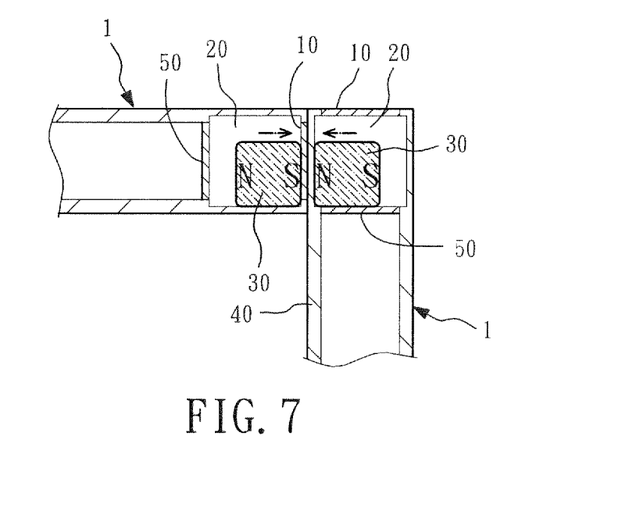
Figure 8:
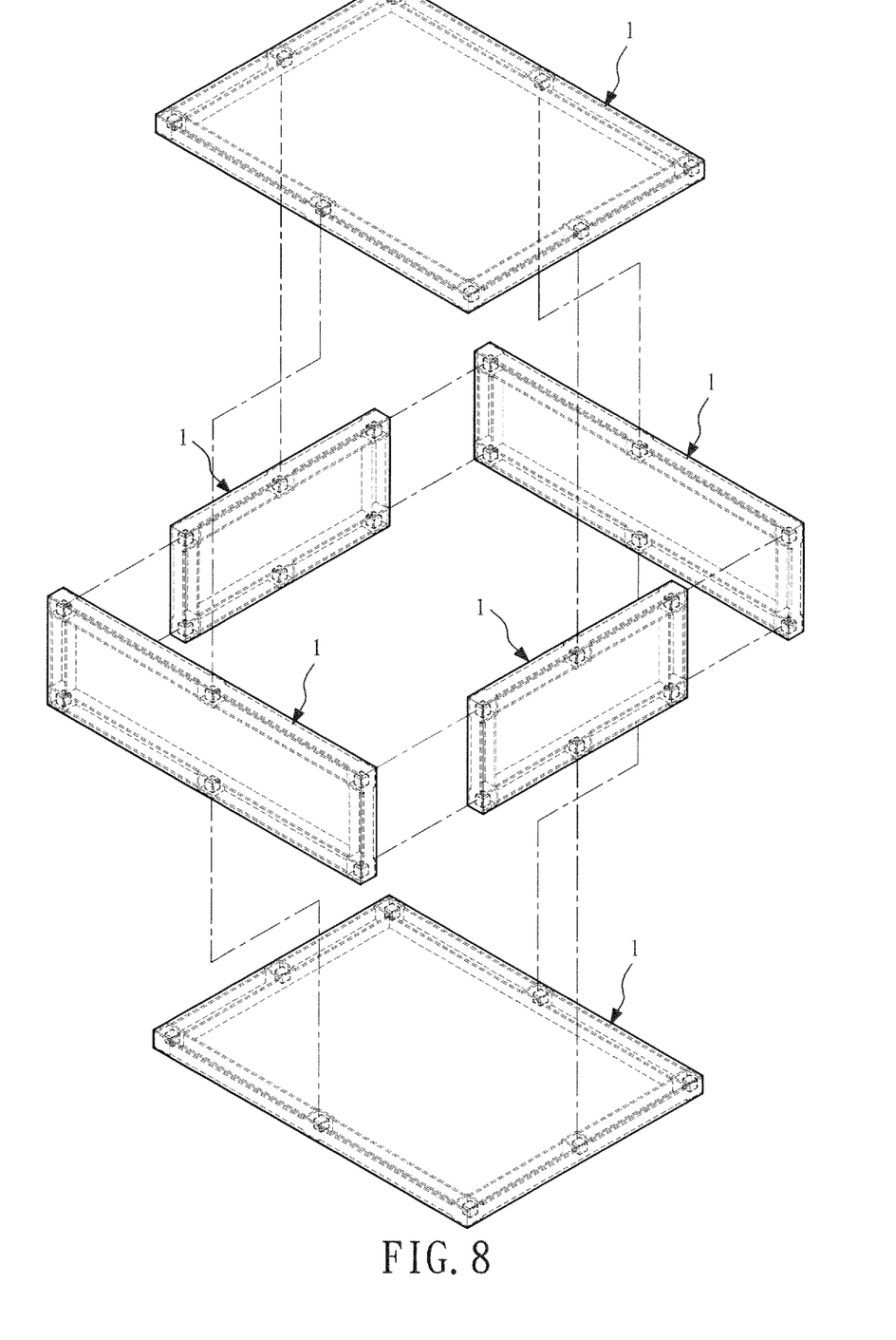
Figure 9:
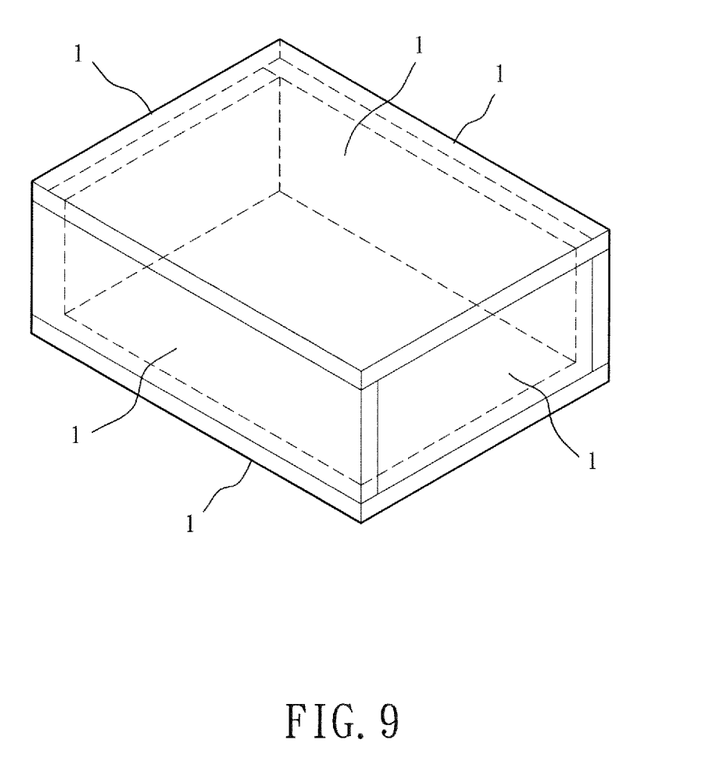
Figure 10:
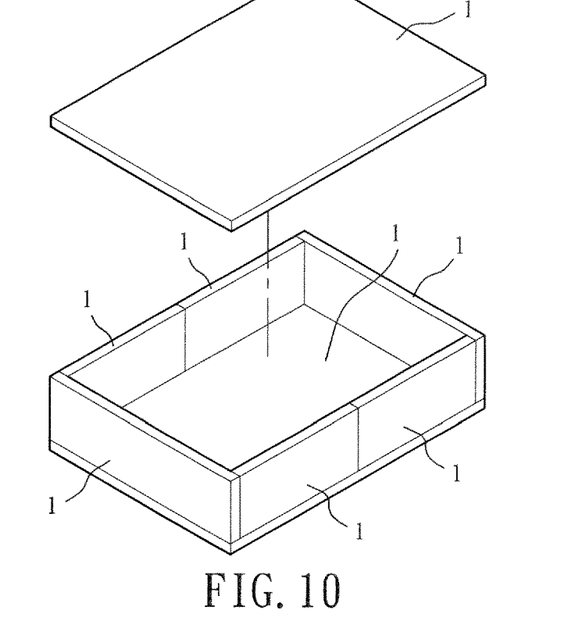
Figure 11:
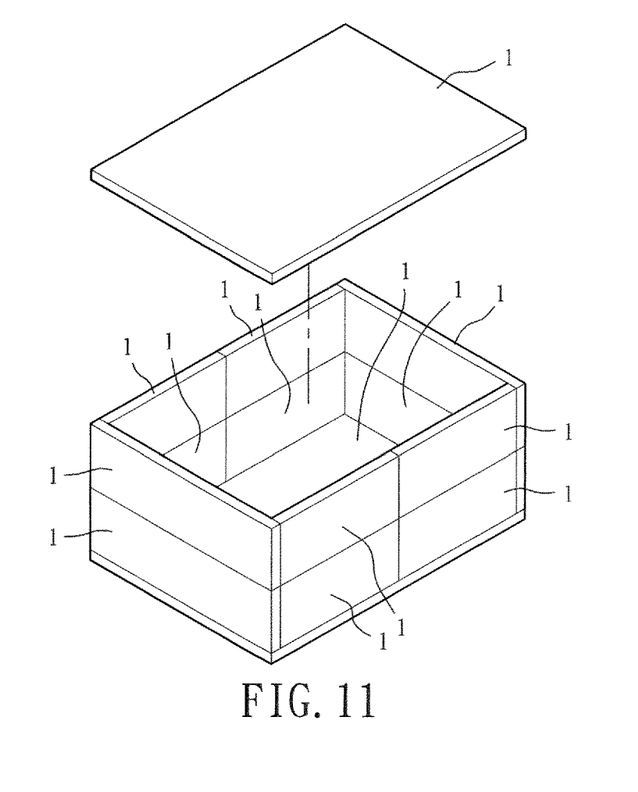
Figure 12:
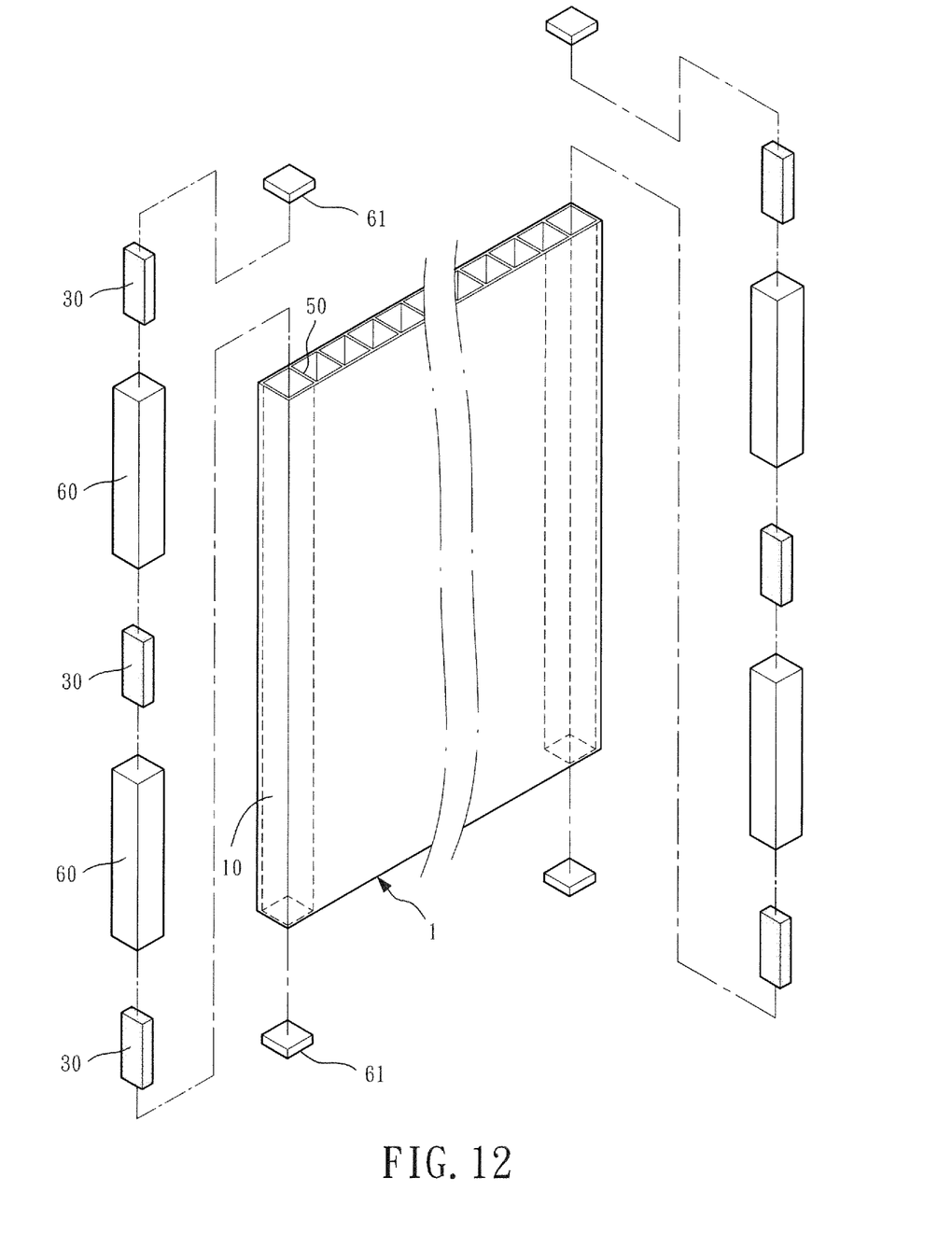
FIG. 12 is an exploded view of another structure according to the present invention.
Figure 13:
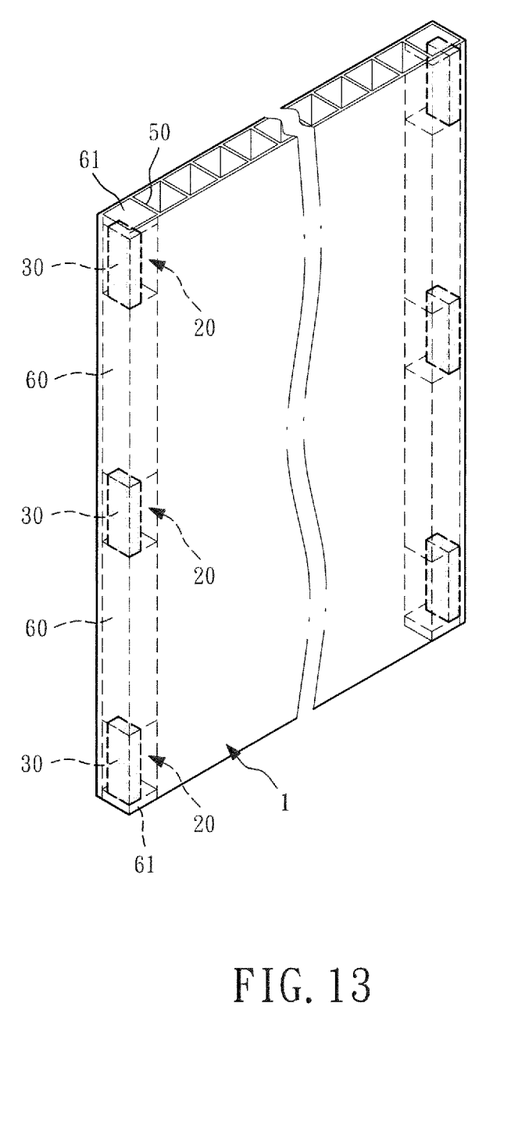
FIG. 13 is a perspective view of said another structure according to the present invention.
Figure 14:
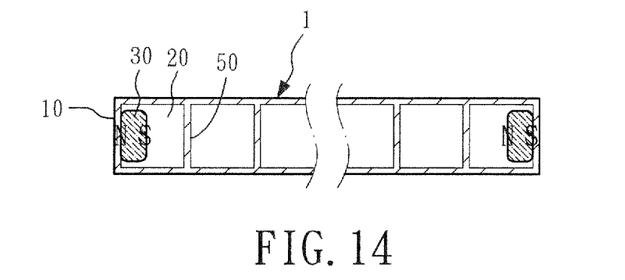
FIG. 14 is a top-plan cross-sectional view of said another structure according to the present invention.
Figure 15:
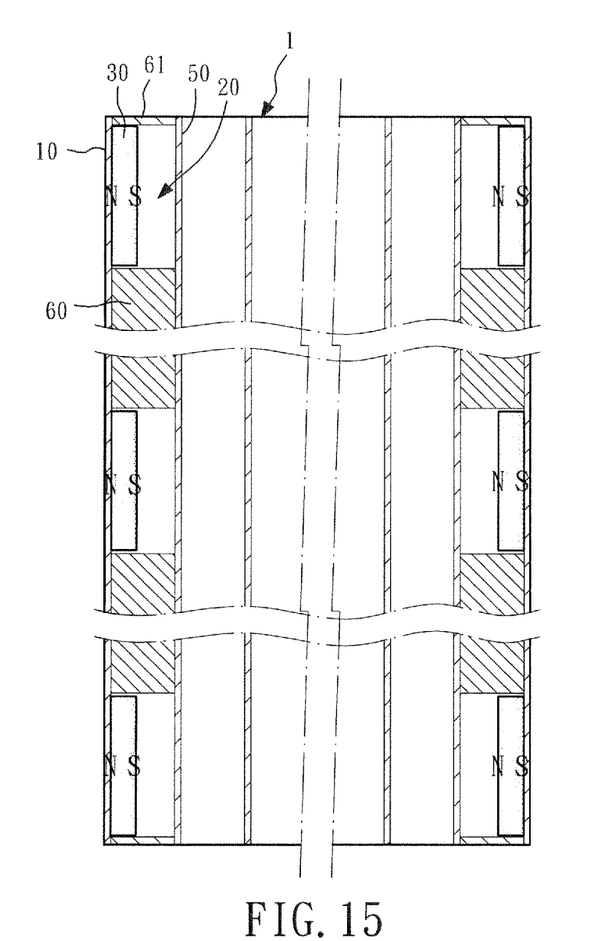
FIG. 15 is a front-side cross-sectional view of said another structure according to the present invention.
Figure 16:
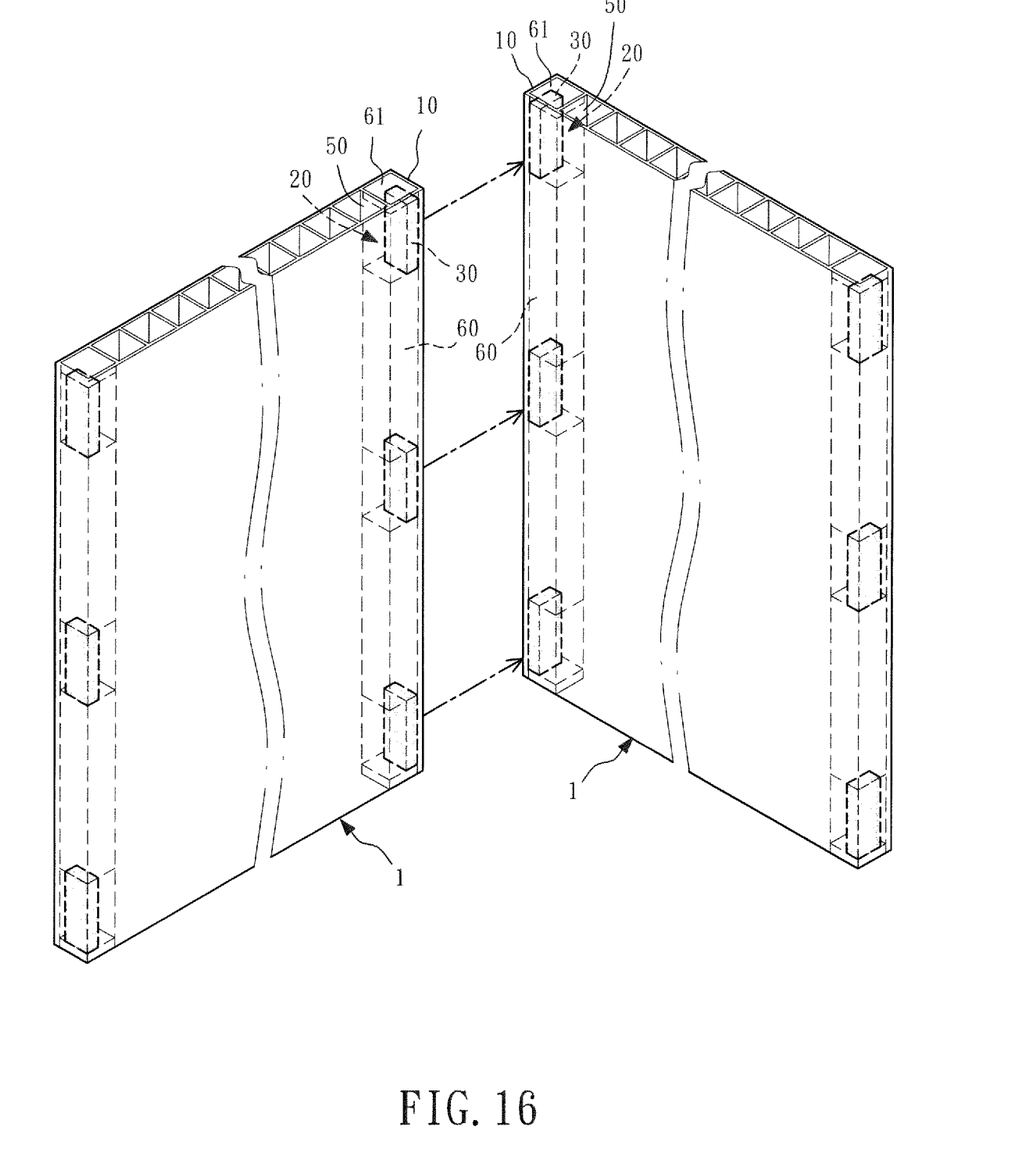
FIGS. 16-22 are schematic views demonstrating an example of use of said another embodiment according to the present invention.
Figure 17:
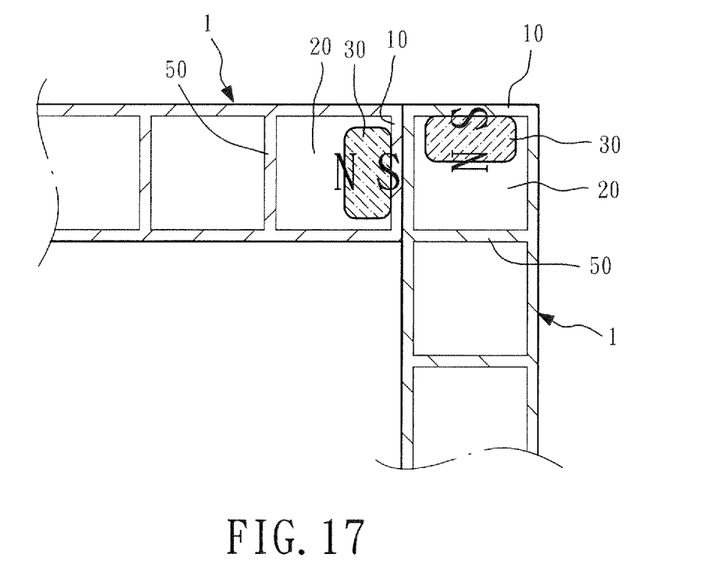
Figure 18:
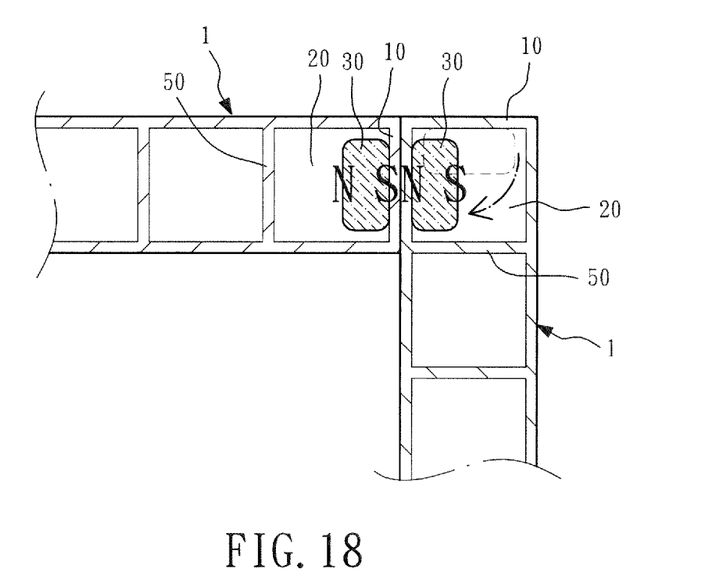
Figure 19:
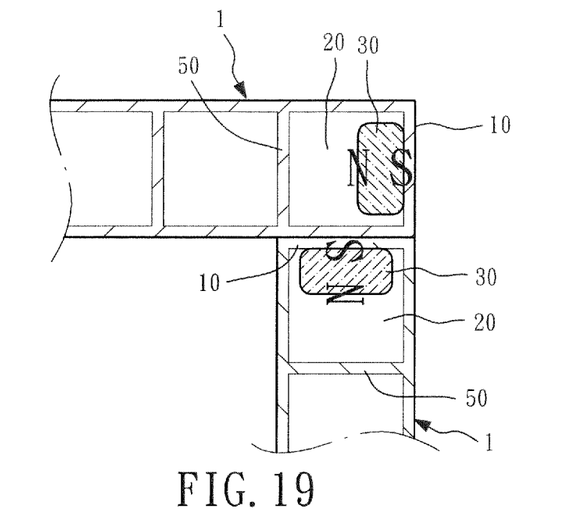
Figure 20:
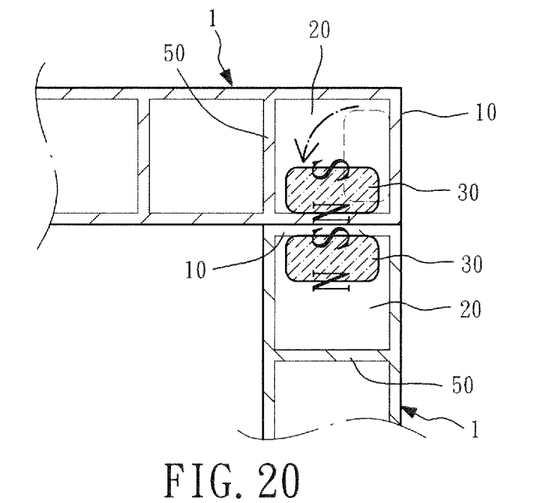
Figure 21:
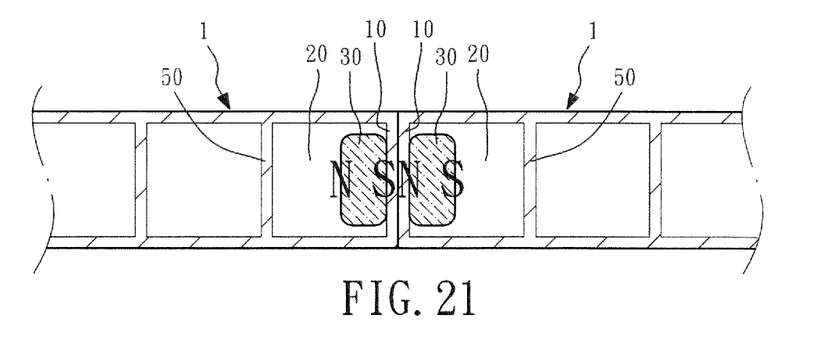
Figure 22:
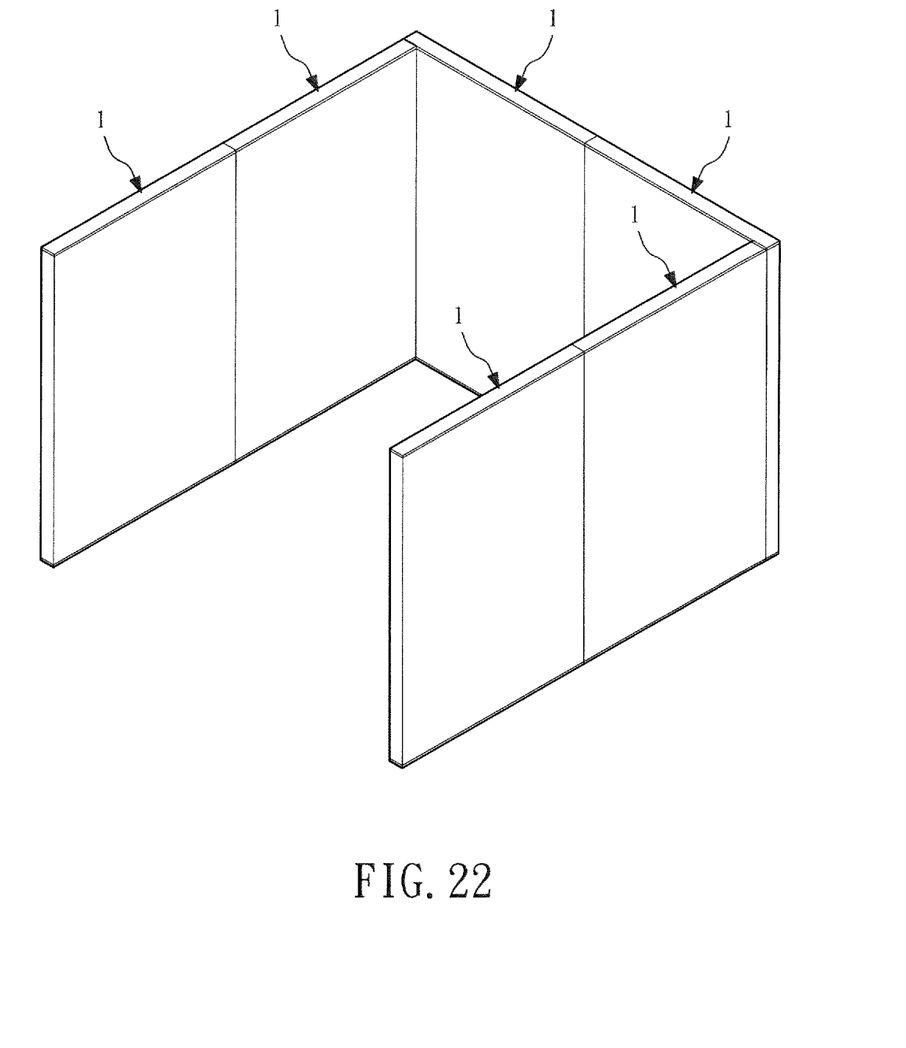

Referring to FIGS. 6 and 7, the magnets 30 that are disposed in two of such movement spaces 20 automatically move or rotate due to magnetic attraction of opposite magnetic polarities, so as to mutually and magnetically attract each other, allowing the contact surfaces of the two main bodies 1 to securely fix to each other through connection resulting from magnetically attracting each other. Thus, there is no need for any exposed connecting piece to have multiple such main bodies 1 to directly contact and connect for forming various three-dimensional configurations, such as a box and a partition structure, and there will be protruding piece at the connection site.

The present invention has advantages of aesthetics, environment-friendliness, reduced number of components, which leads to a reduced cost, easy and convenient assembly, and being easy to stow and transport.

Referring to FIGS. 8-11, the main body 1 of the present invention can be made in a board configuration of various sizes for connection to form a box. The number of the main bodies 1 that are connected to make the box can be increased or decreased, as desired, to change the size of the box so made.

Referring to FIGS. 12-15, in an embodiment of the structure, the peripheral edge of the main body 1 is provided, in the interior thereof, with a channel, through the disposition of the separation plate 50 therein. In the channel, multiple blockers 60, 61, which may be of different sizes, are disposed in the channel to delimit the movement space 20.

In an embodiment of the structure, the magnet 30 has a shape of an elongate flat body.

Referring to FIGS. 16-22, following the example of use of the structure described previously, in a similar way, the connection surface 10 of the main body 1 is oriented to face another main body 1 to allow the outside surfaces thereof to contact with each other at the location corresponding to the magnets 30. Due to magnetic attraction of opposite magnetic polarities, the magnets 30 arranged in two of such movement spaces 20 automatically move or rotate to mutually and magnetically attract each other, so as to have the connection surfaces 10 of the two main bodies 1 to securely fix to each other through connection resulting from magnetically attracting each other. As such, multiple such main bodies 1 can be connected, through direct contact, to form a partition structure.

Figure 23:
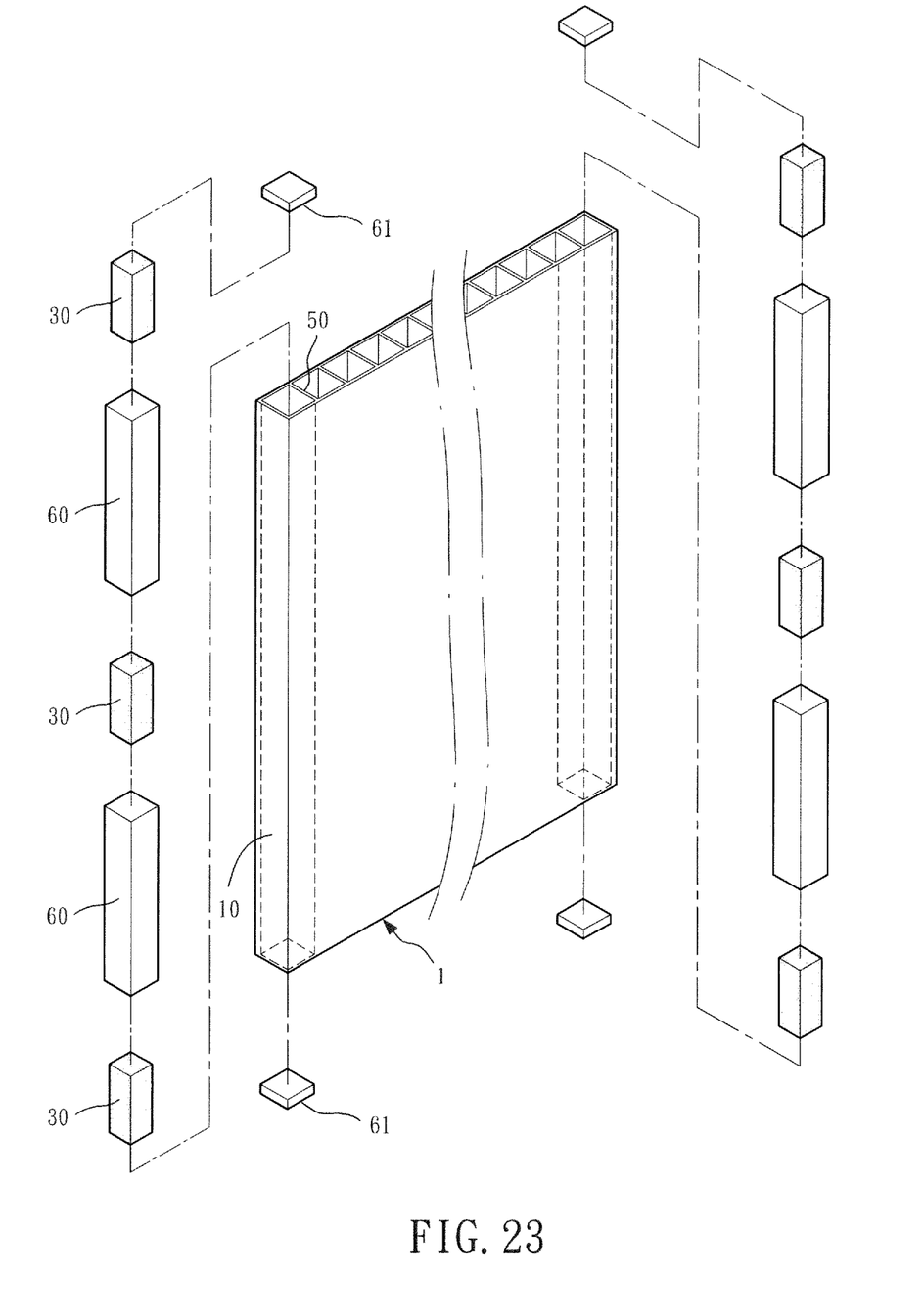
FIG. 23 is an exploded view of a further structure according to the present invention.

Referring to FIG. 23, in an embodiment of the structure, the magnet 30 is of a square cuboidal shape.

I claim:

1. A magnetic attraction connection structure, which is applicable to combination partitions and boxes, the magnetic attraction connection structure comprising a main body, the main body having a peripheral edge on which at least one connection surface is defined, the main body being provided with at least one movement space that is formed in an interior of the peripheral edge at one side of the connection surface, the movement space being provided with a magnet arranged in an interior thereof, the movement space being of a size that is sufficient to allow the magnet to automatically move in a direction toward the connection surface or to rotate by an angle,
   wherein the movement space provides a space for the magnet to rotate in order to automatically change a direction or a location in which a north pole or a south pole of the magnet is set, so that the connection surface of the main body is positionable to directly face another main body to have outside surfaces to which the magnets correspond contacting each other without first setting or fixing the direction or location of the north pole or south pole of the magnet and without considering a rule of mutual repulsion between identical polarities and mutual attraction between opposite polarities, wherein the magnets arranged in the movement spaces of the main body and said another main body are automatically movable or rotatable, by means of an effect of mutual repulsion between identical polarities and mutual attraction between opposite polarities, into directions for mutual attraction between opposite polarities, so as to realize mutual magnetic attraction to have the contacting surfaces of the two main bodies mutually and magnetically attracting and combining with each other and fixed together to form a partition;
   wherein the peripheral edge of the main body forms a frame, and the frame is provided, on each of an upper side and a lower side thereof, with a surface panel to jointly form a configuration of a board; and
   wherein the peripheral edge of the main body is provided, in the interior thereof, with a separation plate, which defines a channel in the peripheral edge and multiple blockers of different sizes are disposed in the channel to delimit the movement space.

2. The magnetic attraction connection structure according to claim 1, wherein the magnet is of a cubic shape.

3. The magnetic attraction connection structure according to claim 1, wherein the magnet has a shape of an elongate flat body.

4. The magnetic attraction connection structure according to claim 1, wherein the magnet is of a square cuboidal shape.

* * * * *